US007980522B2

(12) United States Patent
Anderson et al.

(10) Patent No.: US 7,980,522 B2
(45) Date of Patent: Jul. 19, 2011

(54) TRAILING EDGE BLADE CLAMP

(75) Inventors: Benjamin W. Anderson, Saint Croix Falls, WI (US); Eric Peterson, Saint Croix Falls, WI (US)

(73) Assignee: Alion Science and Technology Corporation, McLean, VA (US)

( * ) Notice: Subject to any disclaimer, the term of this patent is extended or adjusted under 35 U.S.C. 154(b) by 829 days.

(21) Appl. No.: 12/005,611

(22) Filed: Dec. 28, 2007

(65) Prior Publication Data

US 2009/0166498 A1 Jul. 2, 2009

(51) Int. Cl.
*F16M 11/06* (2006.01)
(52) U.S. Cl. .............. 248/316.5; 248/229.13; 244/17.11
(58) Field of Classification Search .................... 138/99; 244/17.11; 248/228.4, 229.13, 229.23, 230.4, 248/316.5, 316.6; 269/228; 416/143
See application file for complete search history.

(56) References Cited

U.S. PATENT DOCUMENTS 2,110,443 A 3/1938 Larsen
2,986,422 A 5/1961 Renfroe
3,123,392 A 3/1964 Jacobson
3,133,715 A 5/1964 Grunfelder
3,175,851 A * 3/1965 McMurray .................... 285/337
3,556,438 A 1/1971 Meditz
3,802,798 A 4/1974 Hibyan
4,055,026 A * 10/1977 Zwicker ........................ 451/383
4,223,429 A 9/1980 Robinson
4,301,982 A 11/1981 Tiemann
4,339,230 A 7/1982 Hill
4,366,606 A * 1/1983 Willis et al. ................... 269/218
4,427,340 A 1/1984 Metzger et al.
4,445,657 A * 5/1984 Breckenridge ................. 248/73
4,449,703 A 5/1984 Robinson
4,475,607 A * 10/1984 Haney ............................. 188/67
4,535,822 A * 8/1985 Rogers, Jr. ...................... 138/99
4,601,639 A 7/1986 Yen et al.
4,623,300 A 11/1986 Ruzicka
4,818,004 A 4/1989 Oswalt et al.
4,881,874 A 11/1989 White et al.
5,263,821 A 11/1993 Noehren et al.
5,383,767 A 1/1995 Aubry
5,697,135 A * 12/1997 Dischler ......................... 29/237
5,772,269 A 6/1998 Henning, Jr. et al.
5,797,432 A * 8/1998 Bennett et al. .................. 138/99
5,820,186 A * 10/1998 Schmitz et al. ................. 294/93
5,823,468 A 10/1998 Bothe
5,832,605 A 11/1998 Leahy et al.
5,836,062 A 11/1998 Leahy et al.
5,853,030 A * 12/1998 Walding .......................... 138/99
5,862,576 A 1/1999 Leahy et al.
6,113,352 A 9/2000 Certain et al.
6,213,712 B1 4/2001 Muylaert (Continued)

*Primary Examiner* — Terrell McKinnon
*Assistant Examiner* — Daniel J Breslin
(74) *Attorney, Agent, or Firm* — Staas & Halsey LLP

(57) ABSTRACT

A blade clamp for a helicopter blade having a width and leading and trailing edges includes a first clamping part, a first flexible liner attachable to the first clamping part, a second clamping part, a second flexible liner attachable to the second clamping part, a hinge mechanism to pivot the first clamping part and the first flexible liner with respect to the second clamping part and the second flexible liner and a connector provided opposite to the hinge mechanism. The flexible liners evenly distribute clamping force upon the blade clamp to prevent damage to the blade. The hinge mechanism allows the first and second clamping parts to open wide enough to safely and easily accommodate a helicopter blade during removal and installation of the blade.

11 Claims, 13 Drawing Sheets

U.S. PATENT DOCUMENTS 6,568,644 B2 * 5/2003 Pedersen .................. 248/229.13
6,644,081 B1 12/2003 Berry
6,681,971 B2 * 1/2004 Laverack et al. ............. 224/319
6,793,186 B2 9/2004 Pedersen
6,800,956 B2 10/2004 Bartlett
6,860,450 B2 3/2005 Muylaert et al.
6,960,065 B2 11/2005 Leach
7,114,924 B2 10/2006 Munsch
7,207,519 B2 4/2007 Hoynash
2002/0125282 A1 9/2002 Laverack
2004/0118970 A1 6/2004 Muylaert
2005/0211825 A1 9/2005 Hoynash

* cited by examiner

TRAILING EDGE BLADE CLAMP

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of W31P4Q-05-C-0242 awarded by the United States Army.

BACKGROUND

Rotor blades on military helicopters are routinely removed and installed during maintenance, storage and transportation. Dismantling of a main rotor blade involves the attachment of a blade clamp to the lateral center of gravity of the blade, lifting the blade clamp with a hoist to facilitate removal of the blade from the rotor and then hoisting it away from the helicopter for storage.

The cross section of a typical rotor blade is a classic airfoil design with a rounded leading edge and a sharp trailing edge. The new Blackhawk M model helicopter implements a wide-chord composite main rotor blade containing a trim tab along its trailing edge. “Wide-chord” is a term used to refer to the width of the blades. Composite blade designs are fragile and require sensitive clamping so that the blade is not damaged. The delicate trim tabs on the trailing edge are made with precision, perhaps from a costly material such as titanium alloy strip, for example. By virtue of the blade design, the trim tab is placed at the center of gravity of the blade, which coincidentally is also the blade clamping location.

Securing a rotor blade with a clamp at its center of gravity and connecting a hoist or sling to the clamp to support its weight is known. Blade clamps provide a way to secure or move helicopter blades in order to protect the blades during storage/transit of the helicopter. Protection of a helicopter blade during its removal or installation is critical since many present day helicopter blades are designed with lighter but more fragile materials, allowing for the greater possibility of costly damage. Likewise, modern helicopter blades also require carefully engineered clamps to ensure that damage to the blade does not occur during removal and installation of the blade.

A typical blade clamp is expected to secure the blade at its lateral center of gravity, and when lifted, the blade must hang level from a hoist. Transportation and handling of the blade using the blade clamp must be carried out without any risk of damage to the blade and its accessories. During the clamping operation, the blade clamp must not damage the blade, and thus the blade clamp must avoid certain structurally-sensitive areas on the blade during clamping and removal. Moreover, the clamping pressure must not damage the structure of the blade. The clamping mechanism must be secure, and the structural components used for the blade clamp must have adequate material properties and room temperature durability for the life of the clamp.

Known attempts at a helicopter blade clamp such as U.S. Pat. No. 4,301,982 to Tiemann, feature a leading edge design where the clamp hinge is situated on the leading edge of the blade. Leading edge designs, while able to avoid contact of sensitive trim tabs located on the trailing edge of some types of blades, prevent the blades from entering the blade cradle in a skid.

Additionally, known clamps such as Tiemann, clamp only upon part of the blade, and not along the entire width. This prevents any clamp mechanism from contacting and damaging the sensitive trim tabs on the trailing edge, but at the expense of not evenly distributing the restraining force along the width of the blade. Moreover, because the known blade clamps extend only half-way across the cross section in a clamping-ready position from the leading edge, the blade is not fully secured, resulting in blades being dropped during handling. To prevent this problem, a safety strap was later added to the known blade clamps; however the strap could not be used on blades with trim tabs located at the lateral CG.

Ease of use of known blade clamps is also a problem. Known clamps often require at least three people to maneuver the unclamping of blades and their placement in skids. Moreover, the clamps are too heavy for field use and none of the current clamp designs interface with the blade storage cradle. With the known clamps, removing the blade typically takes 10-15 minutes. First the blade clamp is secured and then a safety strap has to be tied around the trailing edge of the blade. Clamping the blade is done by feel and experience, and any slight mistakes in the clamping process can damage the blade. Once the blades are removed, they are placed with the leading edge down in narrow slots or cradles in a skid. Placing the blade in the skids is challenging, in that the clamp has to be removed at a pre-designated location way from the skid. Then the blade has to be physically lifted by two individuals and placed in the cradle.

Moreover, many known clamps are suited to fit only one type of blade width and cannot safely be used interchangeably with other models of helicopter blades.

Known blade clamps suited for the A/L model Blackhawk helicopter blades have a narrow width. Out of necessity, efforts have been made to use the legacy blade clamps on the newer wide-chord blades. However, special blade clamping challenges present with the new Blackhawk M model blade design prevent these known clamps from being suitable for use.

The older, existing A/L blade clamp requires use of a safety strap due to occurrences of clamp failure. Trim tab location of the M model blades falls at the blade’s center of gravity, the necessary location for clamping. The straps on the existing blade clamp damage the trailing edge. The clamping force used to secure the clamp on the blade creates a line force on the surface of the blade that may damage the blade and its sub-surface structure.

What is needed is an ideal new blade clamp that would be lightweight and easily maneuverable such that it could be lowered and unclamped directly into the cradle by a single individual. Also the ideal blade clamp would be easily maneuverable when removing the blade from the cradle for installation on a helicopter. The ideal blade clamp would be a design with features that make it universally adaptable across other platforms with minor modifications. The ideal blade clamp would be capable of clamping with even force across the width of the blade, clamping on the center of gravity located at the trim tabs, but without damaging the trim tabs. The ideal blade clamp would be capable of all the above features while still meeting certain benchmarked structural requirements.

SUMMARY

The inventors propose a clamp for a helicopter blade. The blade has a width and leading and trailing edges. The clamp has a first clamping part, a first flexible liner, a second clamping part, a second flexible liner, a hinge mechanism and a connector. The first flexible liner is attachable to the first clamping part and has a cross-sectional shape with outer portions and a recessed middle. The first clamping part fits on a first side of the helicopter blade with the first flexible liner interfacing with the helicopter blade. The first flexible liner has a clamping length at least equal to the width of the helicopter blade. The second flexible liner is attachable to the second clamping part. The second clamping part fits on a second side of the helicopter blade with the second flexible liner interfacing with the helicopter blade such that the helicopter blade can be clamped between the first and second flexible liners. The hinge mechanism pivots the first clamping part and the first flexible liner with respect to the second clamping part and the second flexible liner and vice versa. The hinge mechanism has a pivot point spaced away from the first flexible liner by a distance equal to at least 0.25 times the clamping length. The connector is provided opposite to the hinge mechanism to releasably attach the first and second clamping parts to each other.

The connector may have first and second pieces and an attachment point where the first and second pieces are releasably joined together. The pivot point of the hinge mechanism may be separated from the attachment point of the connector by a distance at least equal to 1.5 times the clamping length.

The first and second flexible liners may be formed of a polyurethane or a neoprene.

The first and second flexible liners may have different hardness values.

The first and second flexible liners may have lips that fit over the first and second clamping parts to attach to the first and second clamping parts, respectfully.

The clamp may have substantially non-flexible structural components that move rigidly with respect to the hinge mechanism, the structural components including the first and second clamping parts. Substantially non-flexible meaning that the structural components are sufficiently rigid as to maintain constant pressure across the width of the blade. In this case, the first and second flexible liners may keep the structural components of the clamp separated from the helicopter blade when the helicopter blade is clamped.

The second clamping part may have front and back parts separated by a secondary hinge. The second flexible liner may have a clamping length less than that of the first flexible liner. When the helicopter blade is clamped between the first and second flexible liners, the secondary hinge may oppose the first clamping part.

The clamp may have a back clamping mechanism with released and fastened configurations. In this case, the released configuration limits an angle of separation between the first and second clamping parts, and the fastened configuration allows the first and second clamping parts to be tightened together at an angle determined by an amount of tightening.

The clamp may have a flexible trim tab guard positioned between the first and second clamping parts and between the flexible liners and the hinge mechanism. In this case, the back clamping mechanism may have a connecting part extending from the first clamping part to the second clamping part. The connecting part may be at least partially surrounded by the trim tab guard. If the second clamping part comprises front and back parts separated by a secondary hinge, when the helicopter blade is clamped between the first and second flexible liners, the secondary hinge opposes the first clamping part. The back clamping mechanism would be between the hinge mechanism and the secondary hinge.

A pivot hoist bar may be pivotally attached to the first clamping part so that the helicopter blade and the clamp can be lifted from above the first clamping part. The pivot hoist bar may be attached to the first clamping part at an attachment point. The attachment point may be variable to adjust to helicopter blades with different centers of gravity.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

So that those of ordinary skill in the art to which the subject invention pertains will more readily understand how to make and use the device described herein, embodiments of the invention will be described in detail with reference to the drawings, wherein.

DETAILED DESCRIPTION OF THE PREFERRED EMBODIMENTS

Reference is now made to the accompanying figures for the purpose of describing, in detail, embodiments of the present invention. The figures and accompanying detailed description are provided as examples of the invention and are not intended to limit the scope of the claims appended hereto.

Figure 2:
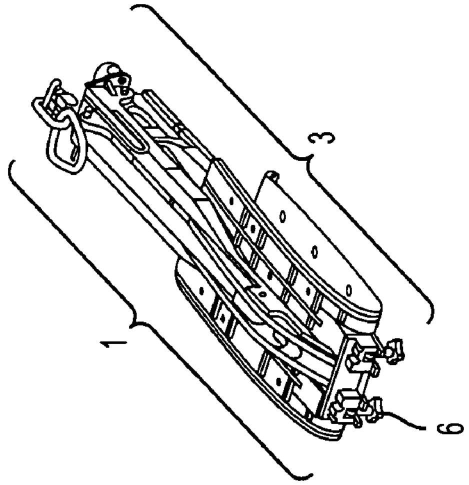
FIG. 2 illustrates a perspective view of the blade clamp without the liners.
Figure 1:
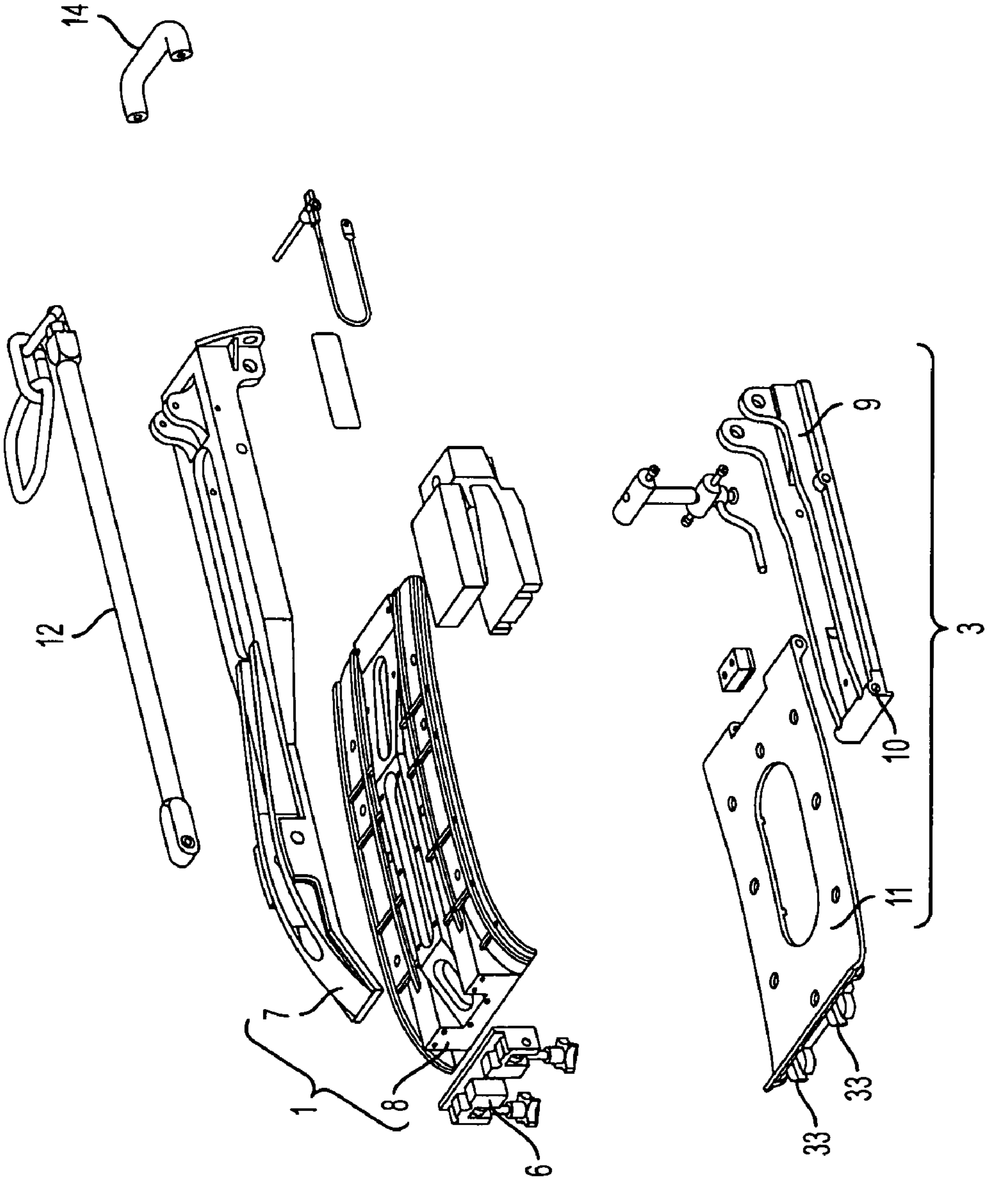
FIG. 1 illustrates an exploded perspective view of the blade clamp without the liners.
Figure 3:
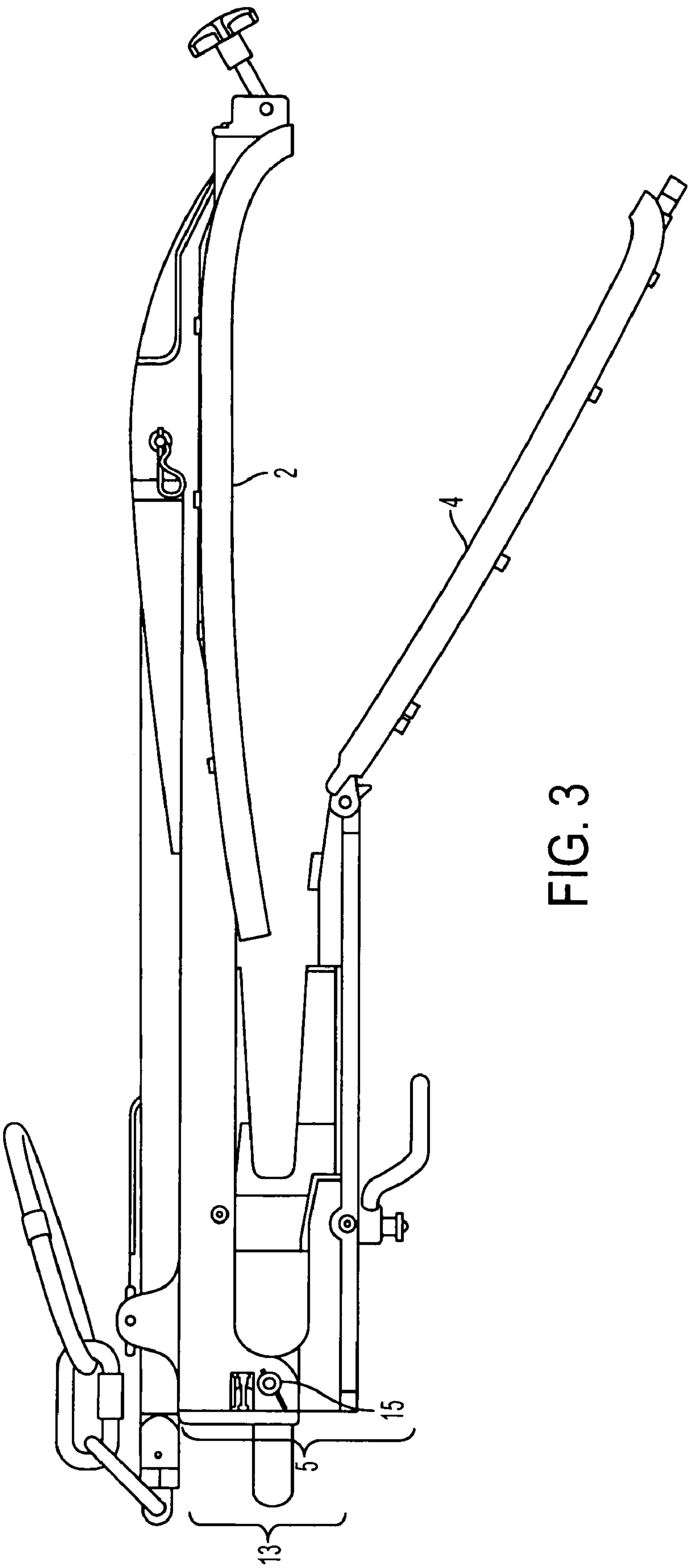
FIG. 3 illustrates a side view with the blade clamp in a released configuration with liners.

Referring to FIGS. 1, 2 and 3, a blade clamp comprises a first clamping part 1, a first flexible liner 2 attachable to the first clamping part, a second clamping part 3, a second flexible liner 4 attachable to the second clamping part, a hinge mechanism 5 and a connector 6. The first and second clamping part may be made of an aluminum alloy and specifically from an aircraft grade aluminum alloy conforming to the profile of the blade. Use of such an alloy provides low weight and superior mechanical properties.

The first clamping part can further comprise a top arm 7 spanning the entire length of the blade clamp to which a top clamp plate 8 is connected. The second clamping part can further comprise a bottom arm 9 with a secondary hinge 10 and a bottom clamp plate 11. The secondary hinge 10 can be used to connect the bottom arm 9 to the bottom clamp plate 11. The top arm 7 can further include a pivot hoist bar 12 to connect the blade clamp to a crane. The top 8 and bottom 11 clamp plates may have a wall thickness in the range of from 0.10 to 1.0 inches, more particularly in the range of from 0.20 to 0.40 inches, and most particularly in the range of from 0.25 to 0.35 inches. The top and bottom clamp plates may be extensively ribbed for stiffness. The top 7 and bottom 9 arms may have a wall thickness in the range of from 0.1 to 1.0 inches, more particularly in the range of from 0.25 to 0.75 inches, and most particularly in the range of from 0.45 to 0.55 inches. The top and bottom arms 7, 9 may not incorporate any ribs.

The top 7 and bottom 9 arms are connected at the rear end of the blade clamp 13. With the two hinge configuration, the bottom arm 9 would open wide to facilitate the opening of the bottom plate 11 of the blade clamp.

The blade clamp may further comprise a handle 14 incorporated at the rear of the clamp to facilitate easy lifting of the blade clamp.

Referring to FIG. 3, the first flexible liner 2 interfaces with the helicopter blade and has a clamping length at least equal to the width of the helicopter blade. The second flexible liner 4 has a clamping length less than that of the first flexible liner. The first 2 and second 4 flexible liners may be formed of a soft flexible material such as polyurethane or a neoprene to wrap around and secure itself to the helicopter's main rotor blade at its center of gravity. The first 2 and second 4 flexible liners are fitted on the top clamp plate 8 and bottom clamp plate 11, and the pair can be removed and replaced with another pair molded to the profile of a different blade, thus allowing one blade clamp to be used for multiple helicopter platforms. These liners protect the blade, especially sensitive composite blades and provide the surface for applying the clamping force. The first 2 and second 4 flexible liners may be color coded to facilitate quick identification a desired liner for use. The first liner 2 may have a durometer (hardness) value different than the second liner 4, the durometer values corresponding to required hardness to evenly support the weight of the blade and distribute the force across the helicopter blade.

A hinge mechanism 5 pivots the first clamping part 1 with respect to the second clamping part 3. The hinge mechanism 5 has a pivot point 15 spaced away from the first flexible liner 2 by a distance equal to at least 0.15 times the clamping length. More specifically, the distance is at least equal to 0.25 times the clamping length. Most specifically, the distance is at least equal to 0.50 times the clamping length. The pivot point 15 of the hinge mechanism may be separated from an attachment point of the connector 6 by a distance at least equal to 1.25 times the clamping length of the blade clamp. More specifically, the distance is at least equal to 1.50 times the clamping length. Most specifically, the distance is at least equal to 1.65 times the clamping length.

Figure 4:
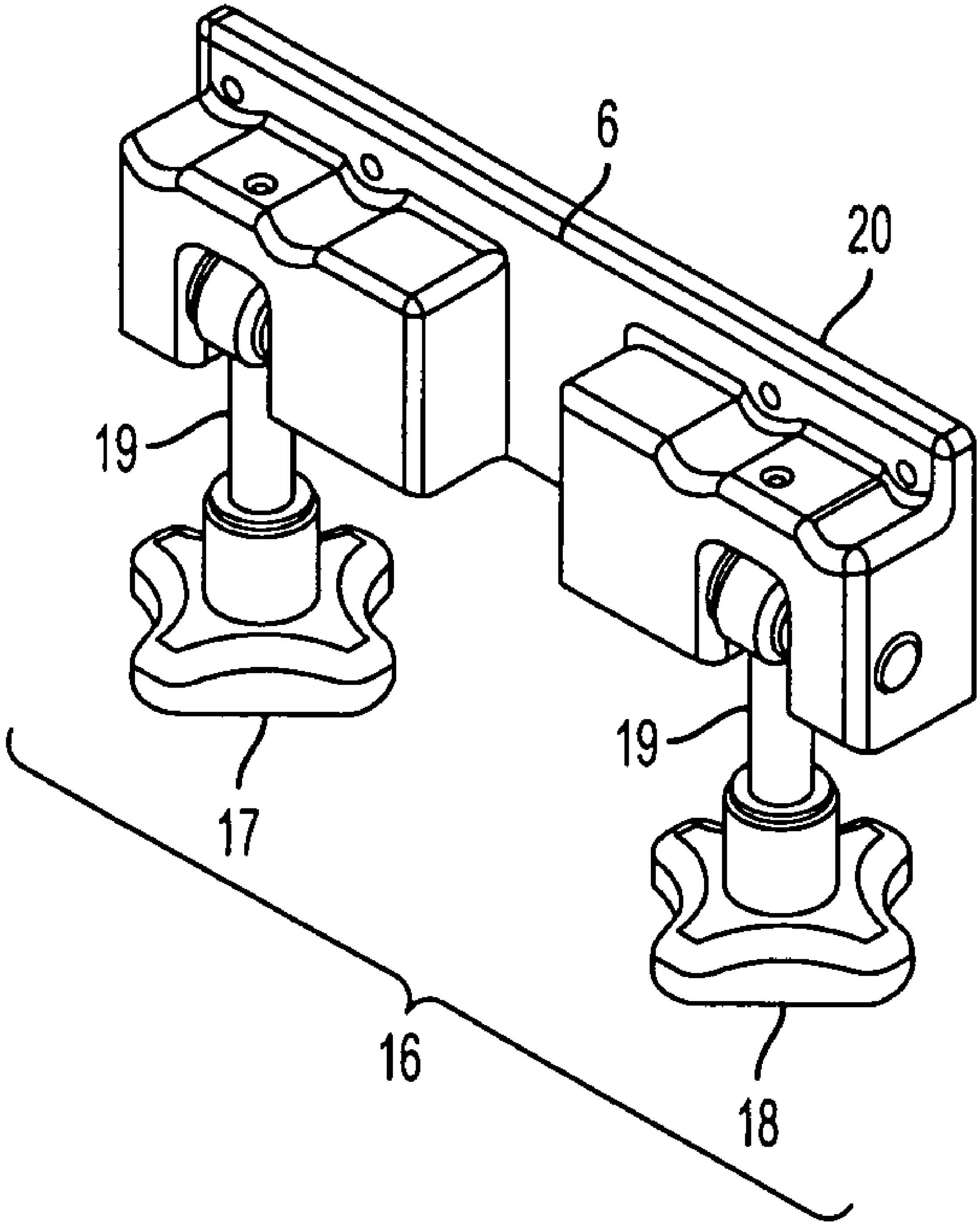
FIG. 4 illustrates a perspective view of the leading edge connecting part.
Figure 5:
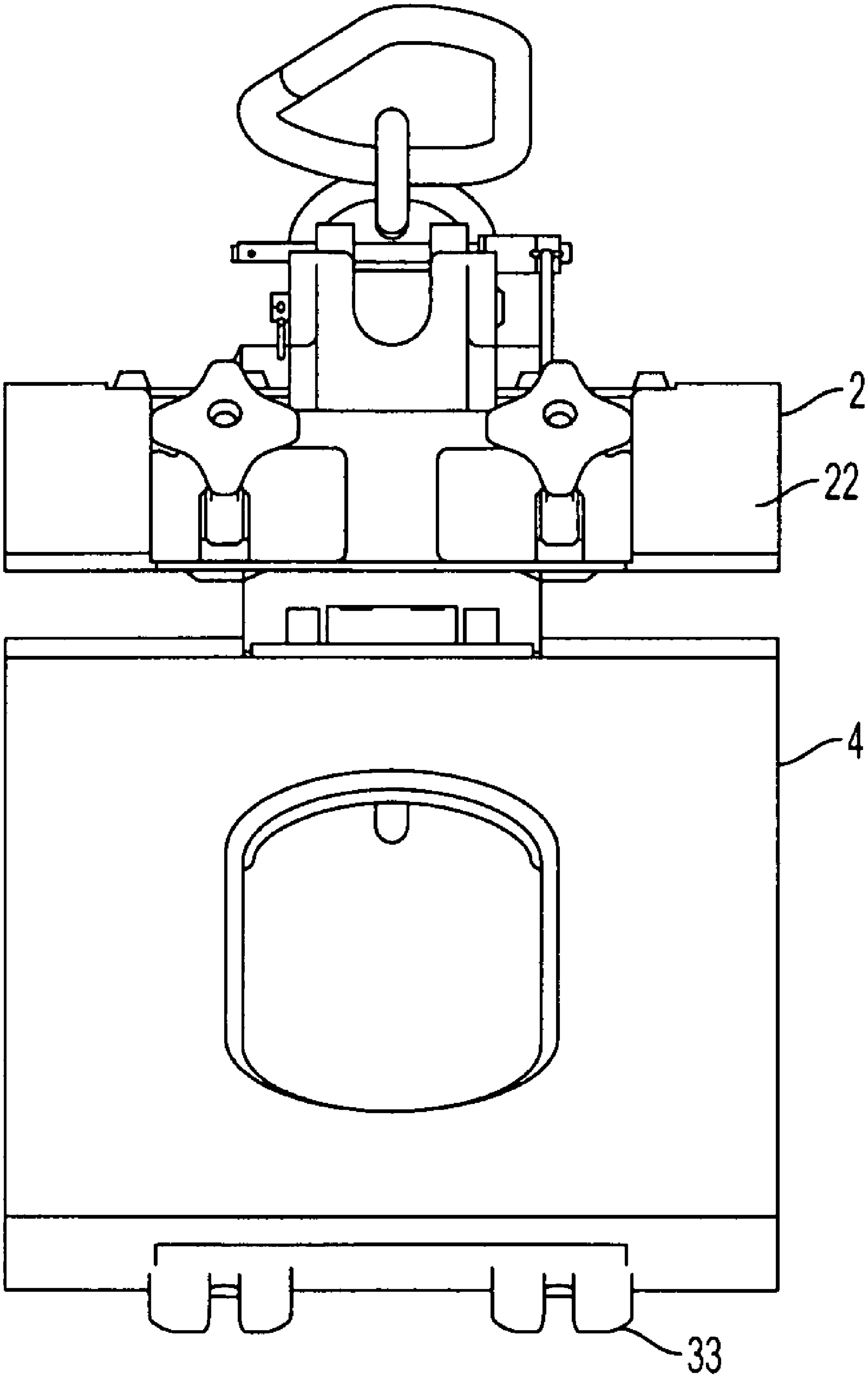
FIG. 5 illustrates a front view of the blade clamp in a released configuration with liners.
Figure 6:
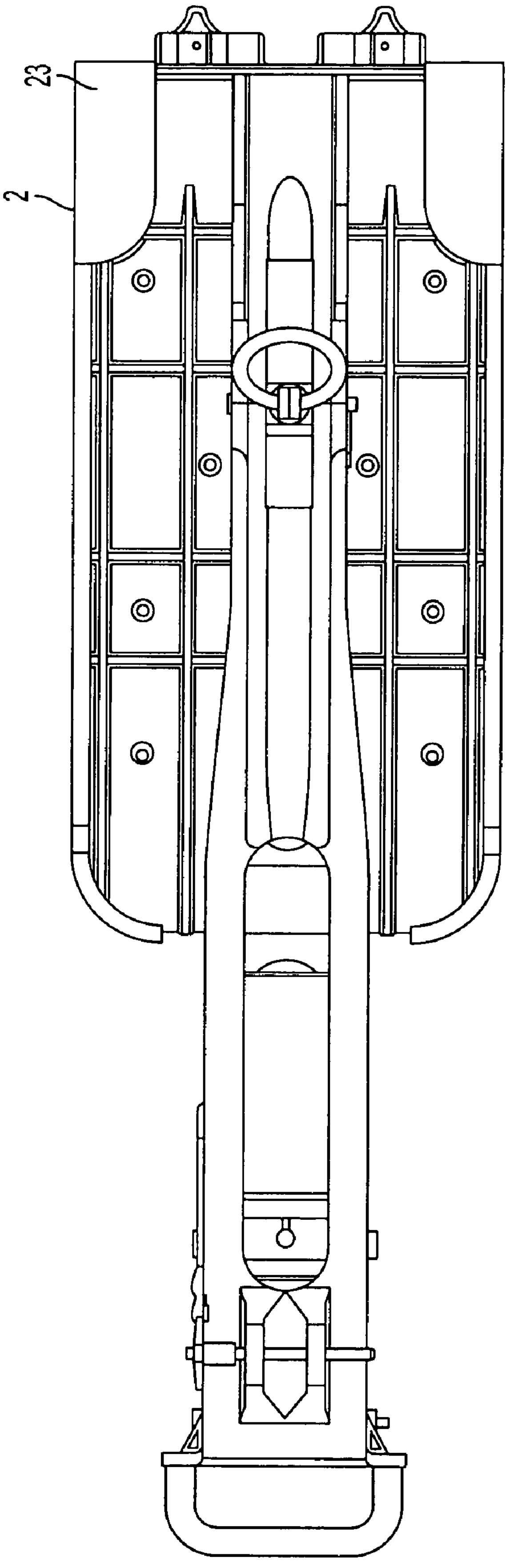
FIG. 6 illustrates a top view of the blade clamp with liners and with the pivot hoist bar extended.
Figure 7:
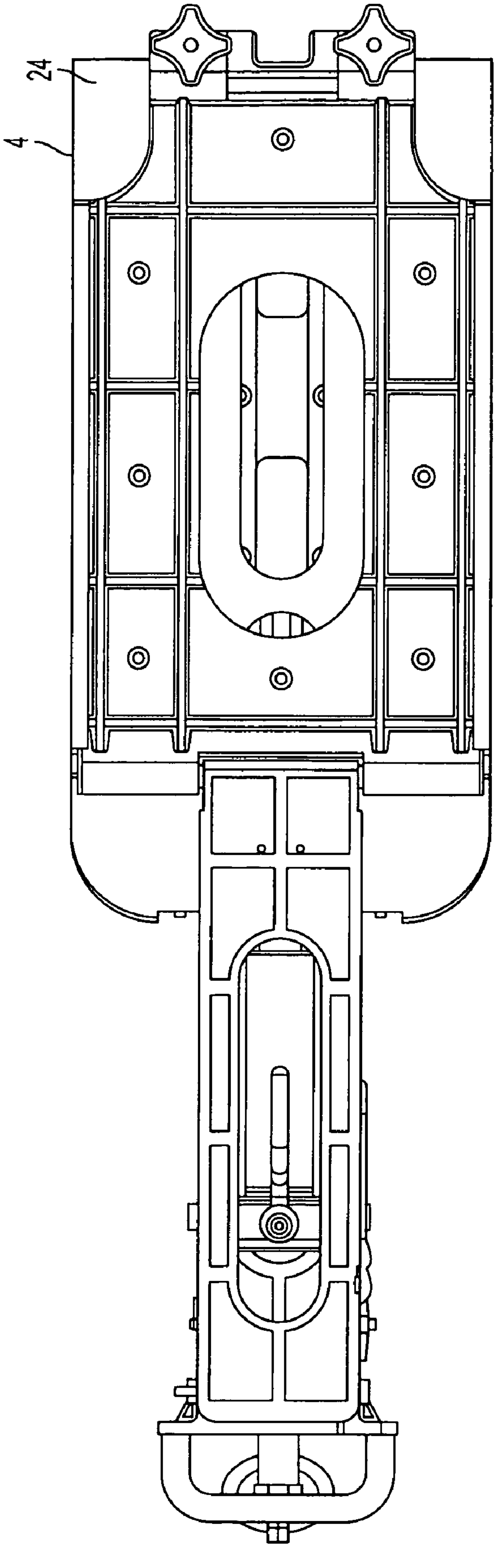
FIG. 7 illustrates a bottom view of the blade clamp with liners, with the pivot hoist bar stowed and with the connector attached.

Referring now to FIGS. 1, 4 and 5, the connector 6 may be a front latch assembly 16 having first 17 and second 18 pieces and an attachment point 33 where the first 17 and second 18 pieces join together. The first 17 and second 18 pieces may comprise of two knobs attached to respective self-supporting threaded rod ends 19, the rod ends 19 being rotatably attached to a top latch plate 20. The top latch plate 20 is attached to the front of the top clamp plate 8. The use of a front latch assembly 16 allows the clamp to slide over the blade from the trailing edge. This allows the clamp to open at the leading edge and be removed from the trailing edge.

Referring to FIGS. 5-8, blade clamp liners 2, 4 substantially uniformly distribute the clamping pressure over the whole blade and therefore protect the blade. A flexible material of higher hardness is selected and used on the inside of the bottom plate. The liners can be custom made to fit the contour of several different types of helicopter blades including the UH-60 (A/L and M models), AH-64 model rotor blades as well as other platforms. The first 2 and second 4 flexible liners clamp securely and evenly distribute the clamping force across the width of the blade, without damaging the blade. Plugs 21 and lips 22, 23 and 24 on the first 2 and second 4 flexible liners may be used to attach the liners to the metal structure of the clamp. The first 2 and second 4 liners are fitted to ensure that all structural components of the clamp are kept separated from the helicopter blade while the blade is being clamped or unclamped.

Figure 8:
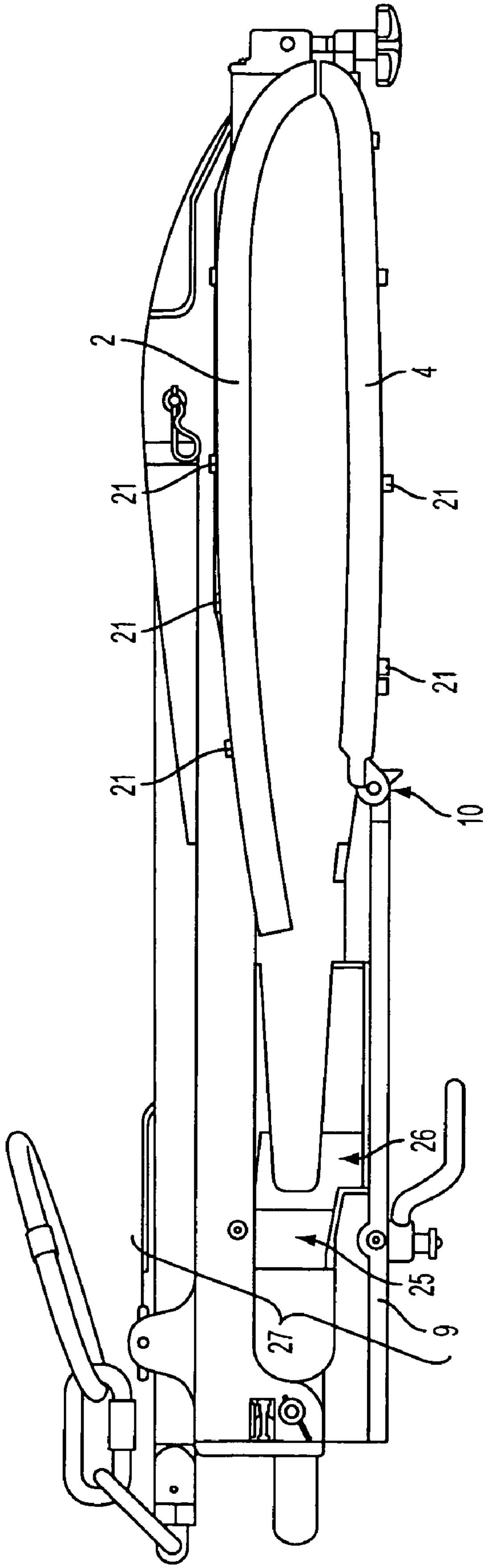
FIG. 8 illustrates a side view of the blade clamp in a fastened configuration with liners.

Referring to FIGS. 1 and 8 the blade clamp may feature a secondary hinge 10 separating the front and back parts. The front part is the bottom blade clamp plate 11 and the back part is the bottom arm 9. As seen in FIG. 8, when the back clamping mechanism 27 is in a fastened configuration, the secondary hinge 10 opposes the first clamping part.

FIG. 8 shows a flexible trim tab guard 26 provided to protect any of the metal pieces of the blade clamp from coming in contact with the trim tabs. Further, FIG. 8 shows the back clamping mechanism 27 having a connecting part 25 extending from the first clamping part 1 to the second clamping part 3. The connecting part 25 is at least partially surrounded by the flexible trim tab guard 26. The back clamping mechanism 27 may be between the hinge mechanism 5 and the secondary hinge 10.

Figure 9:
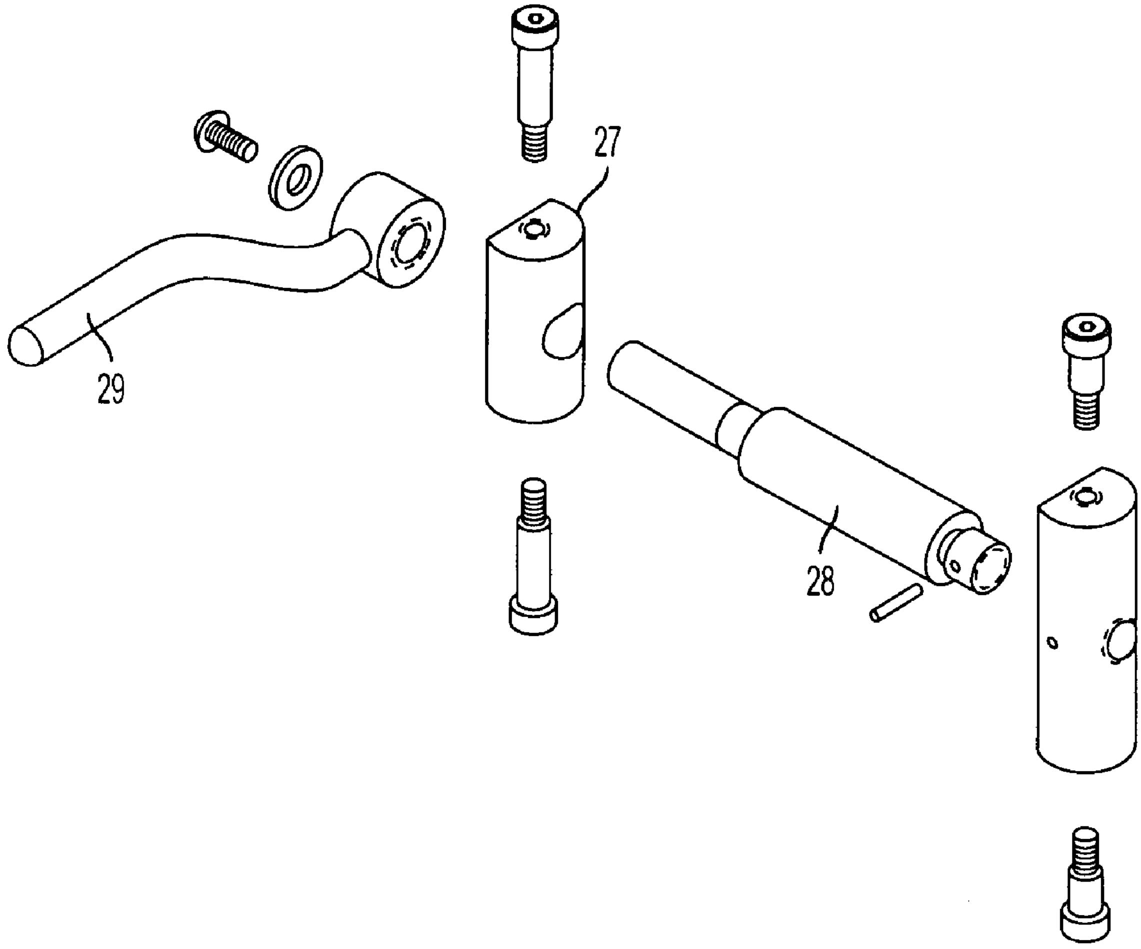
FIG. 9 illustrates an exploded perspective view of the back clamping mechanism.

Referring to FIG. 9, the back clamping mechanism 27 may be an assembly comprising a threaded rod 28 and a handle 29. The connecting part may be the threaded rod 28. The handle 29 may be turned to lengthen the threaded rod 28 and increase the opening at the front of the blade clamp. The handle 29 also may be turned in an opposite direction to shorten the threaded rod and decrease the opening at the front of the blade clamp. Upon blade insertion, and proper clamping, the handle will tighten to disallow further turning, thereby preventing an excess of clamping force from being exerted upon the blade.

Figure 10:
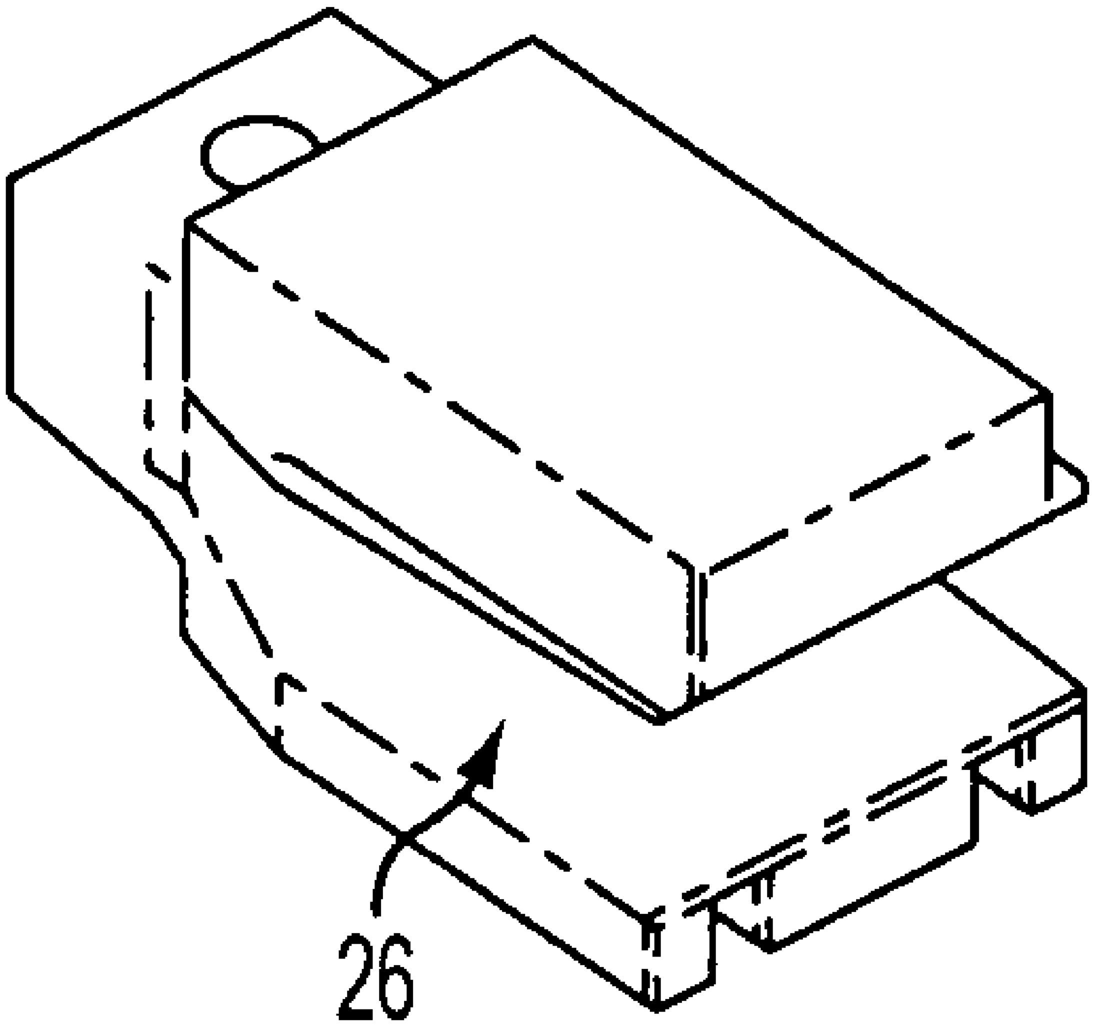
FIG. 10 illustrates a perspective view of the flexible trim tab guard.

As shown in FIG. 10, the flexible trim tab guard 26 may be an integrated foam protector shaped to be positioned between the first and second clamping parts and between the flexible liners and the hinge mechanism.

Figure 11:
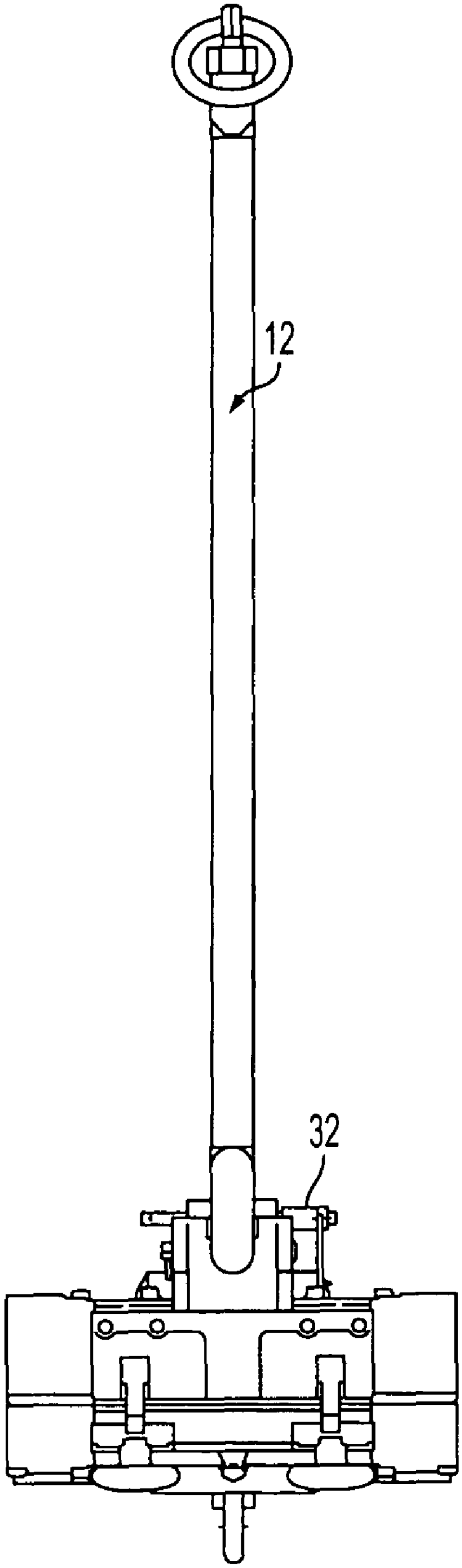
FIG. 11 illustrates a front view of the blade clamp with the liners and with the pivot hoist bar extended.
Figure 12:
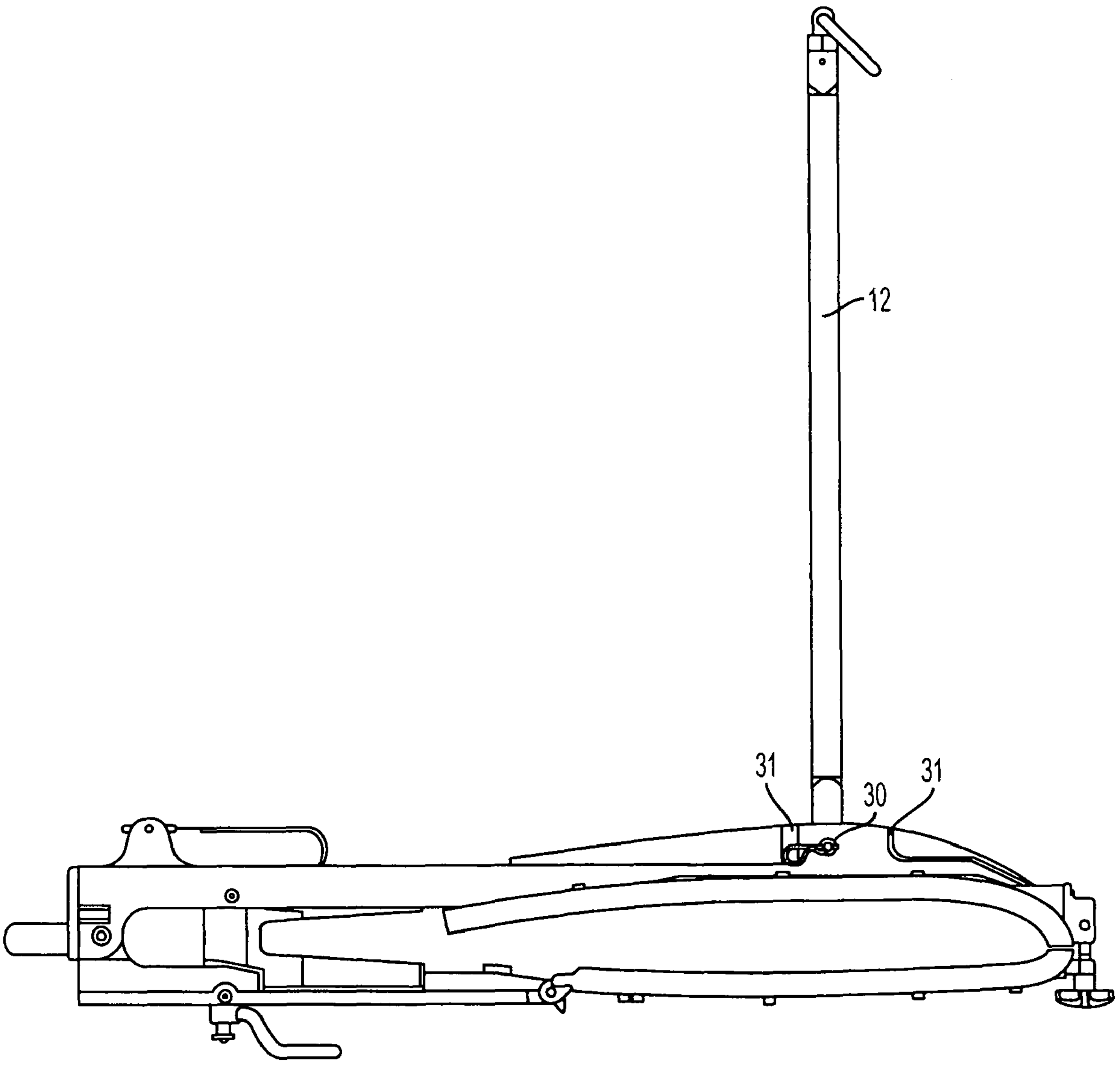
FIG. 12 illustrates a side view of the blade clamp with the liners and with the pivot hoist bar extended.

Referring to FIGS. 11 and 12, a pivot hoist bar 12 may be attached to the first clamping part 1 at an attachment point 30. The attachment point 30 may comprise an elongated hoist slot 31 which is a load bearing structural area during the lifting of the blade. The elongated slot 31 extends through a length where the cord-center of gravity of the blade clamp exists. The pivot hoist bar 12 then may be attached along the elongated hoist slot 31 at the attachment point 30 where the cord-center of gravity exists so that the blade and the blade clamp remained horizontal during lifting of the blade. Thus, the attachment point 30 may be variable so that it can be adjusted to suit helicopter blades with different centers of gravity. The pivot hoist bar 12 allows the blade to hang level/flat or vertical with the leading edge down.

Figure 13:
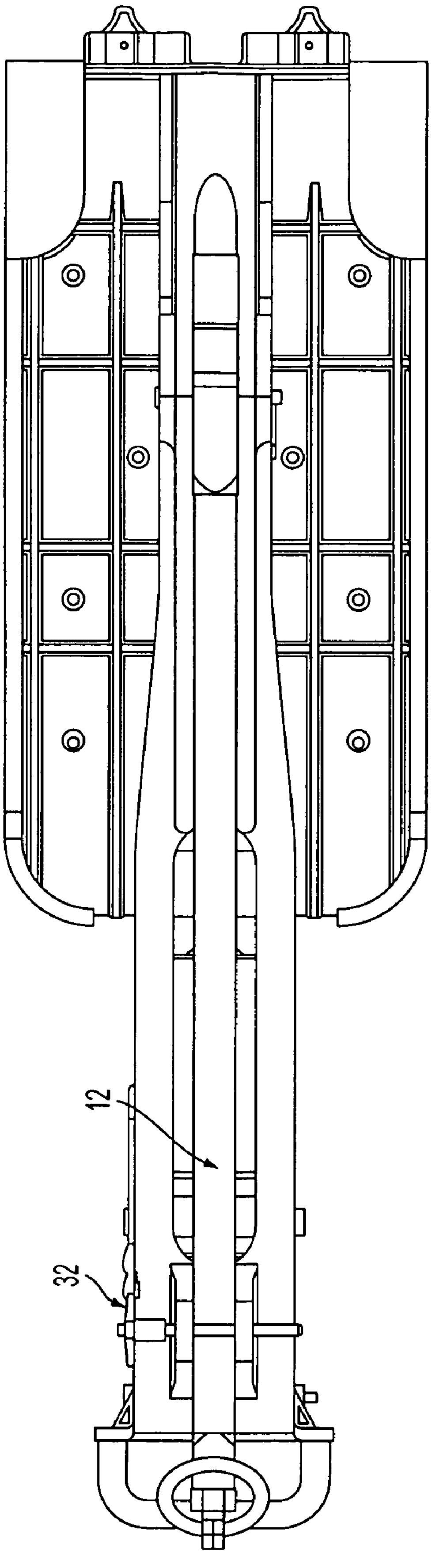
FIG. 13 illustrates a top view of the blade clamp with the liners and with the pivot hoist bar stowed.
Figure 14:
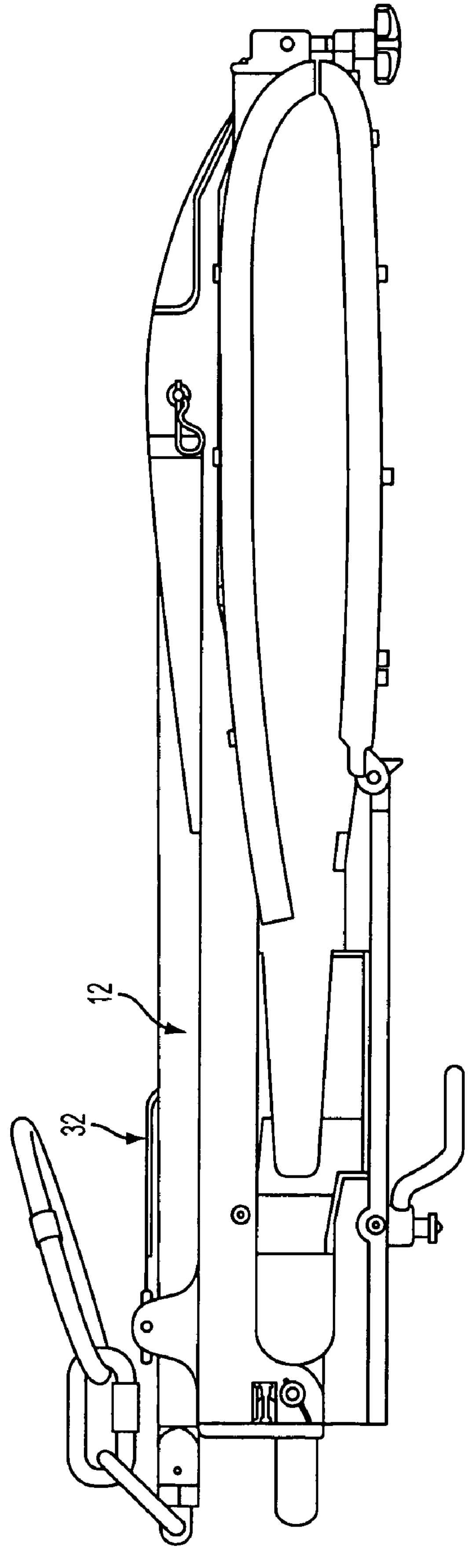
FIG. 14 illustrates a side view of the blade clamp with the liners and with the pivot hoist bar stowed.

Referring to FIGS. 1, 13 and 14, the pivot hoist bar 12 may be stowed in a horizontal position on top of the first clamping part 1 and parallel with the first 1 and second 3 clamping parts. Further, the pivot hoist bar 12 may be secured to the first clamping part 1 using a release pin assembly 32.

Use of this invention is not limited in scope and it is contemplated for use on Blackhawk helicopters as well as on other helicopter platforms.

Those having ordinary skill in the art will readily appreciate that technologies that spawn from helicopter blade clamp projects will have application outside of these projects. For example, a helicopter blade clamp may be used on many other helicopter platforms such as the Apache platform, the various Bell platforms and the Chinook platform. Moreover, a helicopter blade clamp could also be used on other winged aircraft with delicate wings requiring careful and easy removal and installation of wings for storage and transport.

Although a few embodiments have been shown and described, it would be appreciated by those skilled in the art that changes might be made in these embodiments without departing from the principles and spirit of the invention, the scope of which is defined in the claims and their equivalents.

What is claimed is:

1. A clamp for a helicopter blade having a width and leading and trailing edges, comprising:

a first clamping part;

a first flexible liner attachable to the first clamping part and having a cross-sectional shape with outer portions and a recessed middle, the first clamping part fitting on a first side of the helicopter blade with the first flexible liner interfacing with the helicopter blade, the first flexible liner having a clamping length at least equal to the width of the helicopter blade;

a second clamping part;

a second flexible liner attachable to the second clamping part, the second clamping part fitting on a second side of the helicopter blade with the second flexible liner interfacing with the helicopter blade such that the helicopter blade can be clamped between the first and second flexible liners;

a hinge mechanism to pivot the first clamping part and the first flexible liner with respect to the second clamping part and the second flexible liner and vice versa, the hinge mechanism having a pivot point spaced away from the first flexible liner by a distance equal to at least 0.25 times the clamping length; and a connector provided on a lateral end of the clamp opposite to the hinge mechanism to releasably attach the first and second clamping parts to each other, wherein the second clamping part comprises front and back parts separated by a secondary hinge, the back part pivots from the hinge mechanism and extends to the secondary hinge, the front part pivots from the secondary hinge and extends to the connector, opening the hinge mechanism causes the front part to rotate about the pivot point, and when the helicopter blade is clamped between the first and second flexible liners, the secondary hinge opposes the first clamping part.

2. The clamp as claimed in claim 1 wherein:

the connector has first and second pieces and an attachment point where the first and second pieces are releasably joined together, and the pivot point of the hinge mechanism is separated from the attachment point of the connector by a distance at least equal to 1.5 times the clamping length.

3. The clamp as claimed in claim 1 wherein the first and second flexible liners are formed of a polyurethane or a neoprene.

4. The clamp as claimed in claim 1 wherein the first and second flexible liners have different hardness values.

5. The clamp as claimed in claim 1 wherein the first and second flexible liners have lips that fit over the first andsecond clamping parts to attach to the first and second clamping parts, respectfully.

6. The clamp as claimed in claim 1 wherein:

the clamp has substantially non-flexible structural components that move rigidly with respect to the hinge mechanism, the structural components comprising the first and second clamping parts, and the first and second flexible liners keep the structural components of the clamp separated from the helicopter blade when the helicopter blade is clamped.

7. The clamp as claimed in claim 1, wherein:

the second flexible liner has a clamping length less than that of the first flexible liner.

8. The clamp as claimed in claim 1, further comprising a back clamping mechanism having released and fastened configurations, the released configuration limiting an angle of separation between the first and second clamping parts, the fastened configuration allowing the first and second clamping parts to be tightened together at an angle determined by an amount of tightening.

9. The clamp as claimed in claim 1, further comprising a pivot hoist bar pivotally attached to the first clamping part so that the helicopter blade and the clamp can be lifted from above the first clamping part.

10. A clamp for a helicopter blade having a width and leading and trailing edges, comprising:

a first clamping part, a first flexible liner attachable to the first clamping part and having a cross-sectional shape with outer portions and a recessed middle, the first clamping part fitting on a first side of the helicopter blade with the first flexible liner interfacing with the helicopter blade, the first flexible liner having a clamping length at least equal to the width of the helicopter blade;

a second clamping part;

a second flexible liner attachable to the second clamping part, the second clamping part fitting on a second side of the helicopter blade with the second flexible liner interfacing with the helicopter blade such that the helicopter blade can be clamped between the first and second flexible liners;

a hinge mechanism to pivot the first clamping part and the first flexible liner with respect to the second clamping part and the second flexible liner and vice versa, the hinge mechanism having a pivot point spaced away from the first flexible liner by a distance equal to at least 0.25 times the clamping length;

a connector provided on a lateral end of the clamp opposite to the hinge mechanism to releasably attach the first and second clamping parts to each other; and a back clamping mechanism having released and fastened configurations, the released configuration limiting an angle of separation between the first and second clamping parts, the fastened configuration allowing the first and second clamping parts to be tightened together at an angle determined by an amount of tightening, wherein:

the clamp further comprises a flexible trim tab guard positioned between the first and second clamping parts and between the flexible liners and the hinge mechanism, the back clamping mechanism has a connecting part extending from the first clamping part to the second clamping part, and the connecting part is at least partially surrounded by the trim tab guard.

11. The clamp as claimed in claim 9 wherein:

the pivot hoist bar is attached to the first clamping part at an attachment point, and the attachment point is variable to adjust to helicopter blades with different centers of gravity.

* * * * *